(12) United States Patent
Mayes et al.

(10) Patent No.: US 6,361,901 B1
(45) Date of Patent: Mar. 26, 2002

(54) SELF-DOPED MICROPHASE SEPARATED BLOCK COPOLYMER ELECTROLYTE

(75) Inventors: Anne M. Mayes; Donald R. Sadoway, both of Waltham; Pallab Banerjee, Boston; Philip Soo; Biying Huang, both of Cambridge, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/360,427

(22) Filed: Jul. 23, 1999

Related U.S. Application Data

(60) Provisional application No. 60/093,907, filed on Jul. 23, 1998.

(51) Int. Cl.[7] .................................................. H01M 6/18
(52) U.S. Cl. ........................................ 429/309; 429/188
(58) Field of Search ................................. 429/309, 188

(56) References Cited

U.S. PATENT DOCUMENTS

| | | |
|---|---|---|
| 5,102,751 A | 4/1992 | Narang et al. |
| 5,240,791 A | 8/1993 | Izuti et al. |
| 5,356,553 A | 10/1994 | Kono et al. |
| 5,419,984 A | 5/1995 | Chaloner-Gill et al. |
| 5,453,335 A | 9/1995 | Fauteux et al. |
| 5,472,808 A * | 12/1995 | Peled .................. 429/192 |
| 5,523,180 A * | 6/1996 | Armand ................ 429/188 |
| 5,548,055 A | 8/1996 | Narang et al. |
| 5,569,560 A * | 10/1996 | Olsen .................. 429/192 |
| 5,609,795 A | 3/1997 | Matsumoto et al. |
| 5,648,186 A | 7/1997 | Daroux et al. |
| 5,667,913 A | 9/1997 | Chen et al. |
| 5,705,689 A * | 1/1998 | Lee ..................... 562/873 |
| 5,731,104 A | 3/1998 | Ventura et al. |
| 5,789,106 A | 8/1998 | Rosenmeier et al. |
| 5,863,454 A | 1/1999 | Chen et al. |
| 5,917,693 A | 6/1999 | Kono et al. |
| 5,919,578 A * | 7/1999 | Mukherjee ............ 429/213 |

FOREIGN PATENT DOCUMENTS

WO    WO 98/16960    4/1998

* cited by examiner

Primary Examiner—Gabrielle Brouillette
Assistant Examiner—Mark Ruthkosky
(74) Attorney, Agent, or Firm—Clark & Elbing, LLP

(57) ABSTRACT

A polymer electrolyte includes a self-doped microphase separated block copolymer including at least one ionically conductive block and at least one second block that is immiscible in the ionically conductive block, an anion immobilized on the polymer electrolyte and a cationic species. The ionically conductive block provides a continuous ionically conductive pathway through the electrolyte. The electrolyte may be used as an electrolyte in an electrochemical cell.

30 Claims, 8 Drawing Sheets

SELF-DOPED MICROPHASE SEPARATED BLOCK COPOLYMER ELECTROLYTE

This application claims priority to application of U.S. Ser. No. 60/093,907 filed Jul. 23, 1998 and entitled "Block Copolymer Electrolyte," which is hereby incorporated in its entirety by reference.

The United States government may have rights in this invention by virtue of Department of Energy Grant No. DE-AC07-94ID 13223 to the Idaho National Engineering and Environmental Laboratory University Research Consortium, which is managed by Lockheed-Martin Idaho Technologies, Inc. The United States government may also have certain rights in this invention by virtue of Office of Naval Research contracts no. N00014-99-1-0561 and N00014-99-1-0565.

FIELD OF THE INVENTION

This invention relates to phase separated block copolymers useful as a polymer electrolyte in a battery.

BACKGROUND OF THE INVENTION

Rechargeable batteries enjoy an enormous and constantly growing global market due to the increased use of portable consumer electronic products. The lithium solid polymer electrolyte battery is an attractive rechargeable battery technology due to its high predicted energy density and low associated materials and processing costs. A successful lithium battery requires the use of an electrolyte that is highly conductive in order to sustain a high density.

Contemporary rechargeable lithium ion batteries utilize a liquid electrolyte and are assembled with a physical separator layer between the anode and the cathode to prevent electrical shorting. The use of a physical separator results in increased costs, due to associated materials and processing. In addition, contemporary liquid electrolytes are volatile at elevated temperatures, exhibit electrochemical breakdown at voltages (~4.5V) that fail to fully exhibit cathode capacity, and can react chemically with electrode components. This limits both the (total available charge) and the maximum current density and reduces the useful cycle life (number of charge/discharge cycles to failure).

In order to overcome the limitations inherent in liquid electrolytes, solid polymer electrolytes have been developed in which ion mobility is possible through coordination of the lithium ion with suitable sites on the polymer chain. An inherent inverse relationship between ionic conductivity and dimensional stability exists in most known polymer electrolytes. Prior art electrolytes typically demonstrate either good ionic conductivity or good dimensional stability, but not both. Dimensional stability can be achieved by crosslinking, glassification, and the like, but these arrangements generally impede ionic conductivity since conductivity requires a significant degree of polymer chain mobility.

For example, high molecular weight polyethers such as polyethylene oxide (PEO) have been used as lithium salt electrolytes. However, PEO is crystalline at room temperature which as an adverse effect on the conductivity of the polymer. Above the melting point of PEO ($T_m = 60°$ C.) ionic conductivity increases significantly, but at these temperatures PEO behaves as a viscous liquid and loses much of its dimensional stability (resistance to flow).

Prior efforts have been directed at decreasing the crystallinity of PEO in its solid state through addition of plasticizers or modification of the polymer architecture through random copolymerization and the like. However, these strategies have generally yielded materials with poor mechanical properties, since these materials behave more like liquids than solids.

Crosslinking also has been used as a technique for increasing mechanical rigidity to polymeric electrolytes. A common approach is to prepare network-type structures via irradiation or chemical crosslinking. Not surprisingly, the ionic conductivity of these systems is compromised because the crosslinks limit chain mobility. Furthermore, crosslinked networks of solid polymer electrolyte materials do not flow and are insoluble. Therefore preparation of the electrolyte and its incorporation into and arrangement in the battery may be difficult.

Block copolymers have been proposed for use as solid polymer electrolytes. See, WO 98/16960 by Massachusetts Institute of Technology. Block copolymers are composed of macromolecular moieties (or blocks) of two distinct chemical species that are covalently linked. The chemical connectivity of the blocks results in unique thermodynamic and rheological behavior. At high temperatures or in a common solvent, block copolymers form homogenous phases in which the different blocks are segmentally mixed. Upon lowering the temperature or concentrating the polymer by solvent evaporation, the repulsion between unlike segments increases causing the copolymer to phase separate locally into domains rich in one or the other of the block components. These domains form ordered nanostructures, the morphology of which is governed by the relative volume fraction of the two blocks. The microphase separation process imparts dimensional stability to the material, even for materials in which both blocks individually are inherently amorphous and at temperatures exceeding the glass transition temperature of both blocks.

Published International Application WO 98/16960 describes a solid polymer electrolyte block copolymer that includes an ionically conductive polymer. A continuous lithium ion conducting pathway was obtained. However, the practical cell current is undesirably low. This is attributed to the low transference number for lithium ions in this system ($t_{Li} \approx 0.3-0.5$). Stated differently, anionic migration during use may result in a salt concentration gradient in the electrolyte. Anions are attracted to the positive electrode (cathode) causing salt depletion from the electrolyte interior. Such a concentration gradient impedes the movement of the lithium ions between the electrodes, resulting in prolonged and undesirable polarization of the cell.

Significant efforts have been directed toward viable solid polymer electrolytes, yet improvements are greatly needed.

It is an object of the present invention to provide an electrolyte for use in batteries that exhibits good ionic conductivity while retaining good dimensional stability.

It is a further object of the invention to provide an electrolyte that possesses a high transference value for the conductive lithium ion.

It is still a further object of the invention to provide a solid electrolyte in which only the cations have high mobility.

It is still a further object of the invention to provide a solid polymer electrolyte in which the anions are immobilized on the polymer electrolyte.

It is also an object of the invention to provide an electrochemical cell having improved overall cell efficiency due to improvements in the electrolyte.

These and other objects of the invention are achieved in practice of the invention described in the description that follows.

SUMMARY OF THE INVENTION

In one aspect, the present invention provides a solid polymer electrolyte including a microphase separated block copolymer comprising at least one ionically conductive block and at least one second block that is immiscible in the ionically conductive block. The solid polymer electrolyte further includes an anion that is immobilized on the polymer electrolyte. The ionically conductive block provides a continuous ionically conductive pathway through the electrolyte. The continuous ionically conductive pathway of the ionically conductive block is due to morphology of microphase separation or defects in microphase separated morphology.

By "immobilized" as the term is used herein, it is meant that the anion interacts strongly with the copolymer blocks such that there is effectively no migration of the anion at values of potential difference encountered in service in the electrochemical cell into which the electrolyte is introduced. In one preferred embodiment of the invention, the anion is immobilized on the ionically conductive block of the block copolymer. In a second preferred embodiment of the invention, the anion is immobilized on the second block of copolymer.

By "microphase separated" as that term is used herein, it is meant that the block copolymer has been subjected to conditions that favor the association of the copolymer chain to form regions or domains within the copolymer containing substantially only a single selected block. The blocks of a microphase separated block copolymer therefore are locally segregated into order domains.

In a preferred embodiment, the microphase separated copolymer blocks are non-glassy and amorphous throughout the temperature range of use, and the mobile cationic species is substantially localized in the ionically conductive block. The cationic species includes lithium, sodium, potassium, magnesium and calcium. In a preferred embodiment of the invention, the anion exhibits delocalized charge density.

The ionically conductive block may include a polymer backbone having polyalkylene oxide or polyalkylene glycol side chains. The polyalkylene oxide or polyalkylene glycol side chains may be of a length less than about 20 oxide units. A preferred polyalkylene oxide is polyethylene oxide. The volume fraction of the ionically conductive block is in the range of about 0.50 to about 0.85.

In one preferred embodiments, the second polymer block is made up of a copolymer comprised of a first monomer selected for its ability to microphase separate from the ionically conductive block and a second monomer comprising an anion or neutral precursor thereof. In other preferred embodiments, the ionically conductive block is made up of a copolymer comprised of a first ionically conductive monomer and a second monomer comprising an anion or neutral precursor thereof. The neutral precursor is convertable into the desired anionic species.

In other preferred embodiments, the polymer electrolyte may further include a conductive liquid. Addition of a conductive liquid results in a ratio of alkylene oxide moiety to lithium ion in the range of 15:1 to 30:1.

In other preferred embodiments, the electrolyte has a transference number of substantially greater than 0.5, preferably greater than 0.8 and more preferably about 0.9 –1.0.

In another aspect, the invention provides a block copolymer including at least one ionically conductive block, at least one second block that is immiscible with the ionically conductive block, an anion immobilized on the polymer electrolyte and a cationic species. The block copolymer may be used as a conductive binder in a cathode or anode.

In another aspect, the invention provides a battery including an electrolyte including a microphase separated block copolymer comprising at least one ionically conductive block and at least one second block that is immiscible in the ionically conductive block. The solid polymer electrolyte further includes an anion that is immobilized on the polymer electrolyte. The ionically conductive block provides a continuous ionically conductive pathway through the electrolyte. The battery further includes a negative electrode in electrical and ionic contact with the electrolyte and a positive electrode separated from the negative electrode in electrical and ionic contact with the electrolyte. An external circuit is in electronic communication with the negative and positive electrodes.

The term "ionic communication" is used to indicate a relationship between components of a battery whereby ions are capable of movement or flow with little or no resistance, i.e., under the driving force normally encountered in the operation of a battery. Such a relationship may exist when components are in direct physical contact with each other or when components communicate via intermediate structures which are capable of transporting the ion of interest.

The term "electronic communication" is used to indicate a relationship between components of a battery whereby electrons are capable of movement or flow with little or no resistance, i.e., under the driving force normally encountered in the operation of a battery.

BRIEF DESCRIPTION OF THE DRAWINGS

The invention is described with reference to the following Figures, which are intended to be illustrative of the invention only and which are in no way intended to be limiting of the invention and in which.

DETAILED DESCRIPTION IF THE INVENTION

The present invention provides an improved solid polymer electrolyte and a method of its manufacture and use. In particular, the invention provides a solid polymer electrolyte as a microphase separated block copolymer having an ionically conductive block and a second block that is immiscible in the ionically conductive block. The solid polymer electrolyte includes an anionic species that is immobilized on the block copolymer and a cationic species to provide charge neutrality and ion mobility. The polymer electrolytes of the present invention are characterized in that they do not require the addition of an electrolyte salt. Thus, the anion-immobilized block copolymer is "self-doped". The inventive solid polymer electrolyte may be incorporated into conventional alkali metal batteries.

Figure 1:
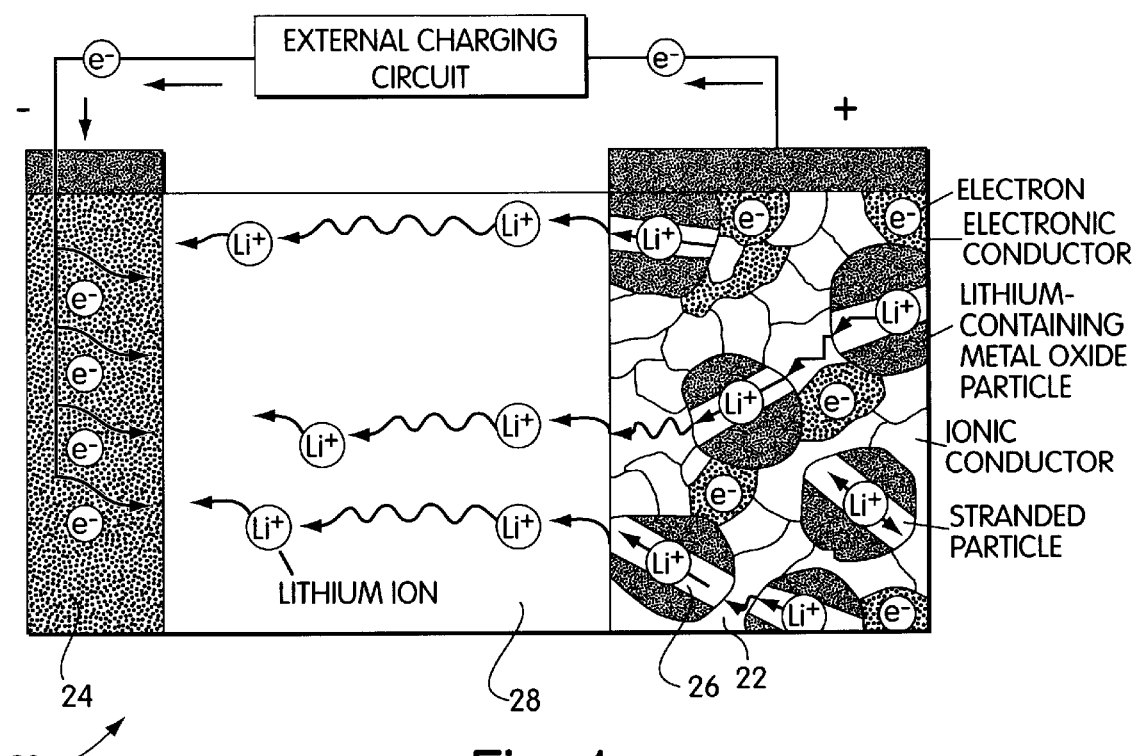
FIG. 1 is a schematic illustration of a typical lithium battery cell.

A typical lithium battery operates in the following matter. With reference to FIG. 1, a lithium battery 20 is charged by applying a voltage between the battery's cathode 22 and anode 24 which causes the lithium ions and electrons to be withdrawn from lithium hosts 26 at the battery cathode 22. Lithium ions flow from the cathode 22 to the battery anode 24 through a polymer electrolyte 28 to be reduced at the anode 24. The process requires energy. During subsequent discharge, lithium ions and electrons re-enter lithium hosts at the cathode 22 while lithium is oxidized to lithium ions at the anode, an energetically favorable process that drives electrons through a load in an external circuit, providing electrical power.

A solid polymer electrolyte based on the microphase separation of two chemically distinct polymer chains into ionically conducting and secondary domains is set forth in the published International Application WO 98/16960. The block copolymer of WO 98/16960 consists of two non-glassy, amorphous polymers, one of which is capable for solubilizing a lithium salt. While the material has been demonstrated to conduct lithium ions as an electrolyte and as a binder in the cathode, the maximum sustainable current of cells into which the electrolyte has been incorporated is disappointingly low. This may be attributed in part to the low transference number of the lithium cation.

During battery operation, anions also move; however, their movement is not productive to the faradaic process of the electrochemical cell. Due to their negative charge, the anions move to the positive electrode (the cathode) resulting in a salt concentration gradient which is an impediment to the faradaic process, as the lithium cations cannot traverse the electrolyte easily. This effect is reflected in the low lithium ion transference value ($t_{Li}$) of the electrolyte of around 0.3–0.5. Where the current is borne by a single ionic species in solution, that ionic species is said to have a transference number of 1.0.

The transference number of the lithium cation in an electrolyte consisting of a single salt, such as LiX, is defined in eq (1) as:

$$t_{Li^+} = \frac{i_{Li^+}}{i} \quad (1)$$

where $i_{Li}^+$ is the current borne by the lithium ion and i is the total current of the system. Current carried by a particular species, k, is a function of its concentration in solution ($C_k$), mobility ($\mu_k$) and valence ($z_k$). Thus the relationship between lithium and other charged species in solution, e.g., the counteranion X, is as shown in eq (2). The mobility of the anion approaches zero under conditions where the anion is immobilized ($\mu \approx 0$). Under these conditions, the total current is effectively borne only by the lithium species and the transference value of lithium approaches 1.0. Based on the above discussion, it is apparent that the transference value of the electrolyte cation may be increased by either increasing the mobility of the cation or by decreasing the mobility of the anion, or both.

$$t_{Li^+} = \frac{C_{Li^+}\mu_{Li^+}z_{Li^+}}{(C_{Li^+}\mu_{Li^+}z_{Li^+}) + (C_{anion}\mu_{anion}z_{anion})} \quad (2)$$

An increase in $t_{Li}$ will result in an improved overall cell efficiency. First of all, higher $T_{Li}$ translates into a lower thermal load as a greater fraction of the total cell current is borne by $Li^{30}$ ions which participate in the faradaic process at the two electrodes. An increase in the value of $T_{Li}$ results in a decrease in the amount of unwanted joule heating per unit cell current. Secondly, higher $T_{Li}$ translates into a lower kinetic barrier to $Li^{30}$ removal from the cathode when the cell is recharging. The barrier is the result of an accumulation of anions from the electrolyte salt dopant at the electrode/electrolyte interface.

In addition, the mobility of the cation may be improved by reducing the charge density of the anion. When the charge of anion is concentrated in a small area, i.e., on a single atom, the anion acts as a point charge which may be strongly attractive to the cation. On the other hand, if the charge of the anion is delocalized over a larger physical area, the attractive force of the anion is diminished at any given location in the electrolyte. Thus, the mobility of the cation may be further enhanced by reducing the charge density of the anion. Charge density may be diffused over a larger physical region in a varies of ways. For example, an anion of large atomic radius may be used, such as iodide. Alternatively, the anion my be multiatomic and the charge may be delocalized ever the entire species, such as a carboxylate $CO_2^-$ or sulfonate group.

According to the invention, an electrolyte that exhibits improved mobility of current carrying cation is provided. The polymer electrolyte having a cationic species is prepared from a block copolumer of at least one ionically conductive block and at least one second block. Anions of the electrolyte are immobilized on the block copolymer. Upon microphase separation, nanoscale domains are formed alternately rich in the ionically conductive and second copolymer blocks. The composition is selected so that the ionically conductive block permits free movement of the mobile cationic species throughout the material. By attachment of the anion to the polymer electrolyte, a high molecular weight "macroanion" is formed. The mobility of the macroanion is low and the transference value of the mobile cation species is enhanced. The anion may be immobilized in either the ionically conductive lock or in the second block, or both. In preferred embodiments, the anion is immobilized in the second block which results in a microphase separation of the cations and anions of the electrolyte. Microphase separation decreases the attractive force of the anion on the migrating lithium, since the two ions are separated into physically distinct domains of the polymer electrolyte. Furthermore, the anions are not free to move throughout the electrolyte and can neither carry current nor act as an impediment to motion of the cations in carrying current.

When the inventive polymer electrolyte is used as a component in a lithium battery, the anions are prevented from a accumulating at the interface and the potential barrier for cation removal from the intercalculation compound particles during charging is reduced. This enables one to pass larger currents through the cell. At the same time, a high value of $T_{Li}$ decreases the joule heating of the cell per unit of current which lessens the chances of uncontrolled heating. Hence the invention provides for a safer, more efficient battery capable of operating at higher currents. The transference umber is greater than 0.5, greater than 0.6, greater than 0.7, greater than 0.8, and preferably about 0.88.

Figure 2:
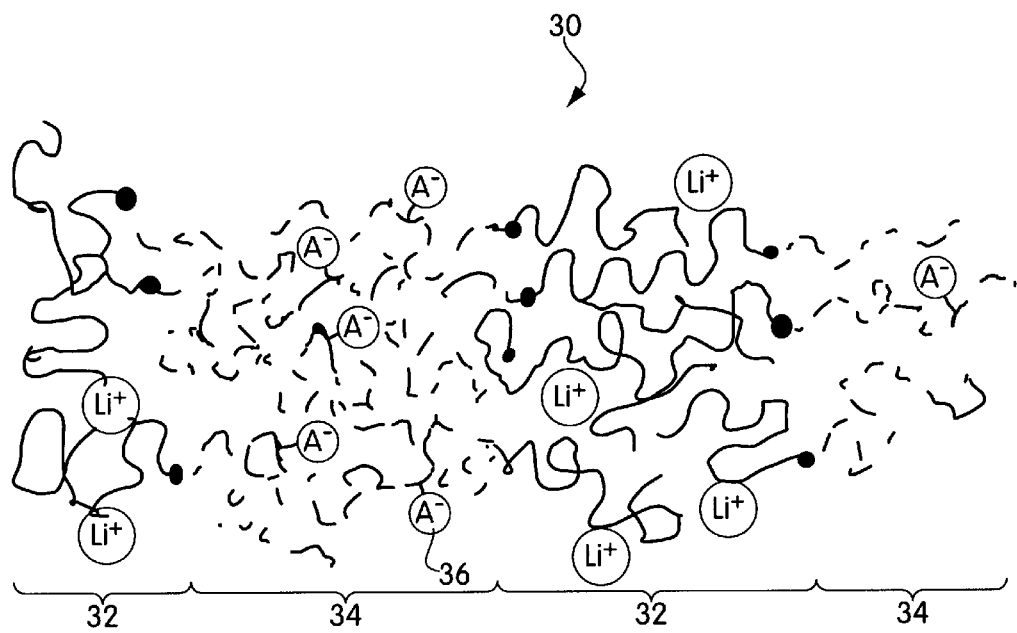
FIG. 2 is a schematic illustration of a polymer electrolyte according to the present invention.

FIG. 2 is a schematic drawing of a lock copolymer solid electrolyte 30 of the invention which may be incorporated into a battery, such as the lithium battery described in FIG. 1. It is understood t at the electrolyte, while specifically described with reference to a lithium battery, may be used in any kind of battery and in any application for which an electrolyte is required. In particular, the electrolyte may be used in the preparation of electrodes as is described in WO 98/16960, which is incorporated herein in its entirety by reference.

The polymer electrolyte 30 is made p of a block copolymer including at least one ionically conductive block 32 and at least one second block 34 and having an immobilized anion 36. The ionically conductive block and the second block are selected such that a phase separated lock copolymer is formed. The block copolymer solid electrolyte of the invention may be a diblock copolymer, triblock copolymer and the like.

The ionically conductive block 32 is comprised of one or more highly electronegative oxygen-containing species, such as alkyl ethers, in which small monovalent and divalent cations are known to be solubilized. Preferred ionically conductive blocks include polymer chains derivatized with polyethylene oxide (PEO), polyethylene glycol (PEG), polypropylene oxide (PPO) and/or polypropylene glycol (PPG). The ionically conductive block may be, but is not limited to, methoxy PEG methacrylate (referred to herein as POEM), methoxy PEG acrylate and other acrylate and polymers modified to include short PEO, PEG, PPO or PPG side chains, polybutadiene modified to include PEO, PEG, PPO, or PPG side chains or polystyrene similarly modified to include alkylether side chains. The number of alkylene oxide unit of the side chain is selected to provide a high ionic conductivity. The side chains may include up to about 20 alkylene oxide units each. Ethylene oxide is a preferred alkylene oxide. In selecting the ionically conductive block polymer, it is helpful to keep in mind the fact that longer side chains may exhibit higher degrees of crystallinity. The ionically-conductive block also can be defined by ionically-conductive polymeric material such that described Ward et al. In U.S. Pat. No. 5,051,211, incorporated herein by reference. In preferred embodiments, the polymer block is selected so that the glass transition temperature of the block is less than service temperature and selected such that crystallization does not occur.

The second block is so as to be immiscible with the ionically conductive block. The second block may include a non-ionically conductive block copolymer. Suitable non-ionically conductive polymers include, but are not limited to, polyalkyl acrylates and methacrylates, such as polydecyl methacrylate, polylauryl methacrylate, polyalkylacrylates an methacrylates, polydimethyl siloxane, polybutadeine, polyisoprene such as polyethylene and polyethylenepropylene and copolymers thereof, and modified polystyrenes with flexible side chains of alkyl fluorocarbon and siloxane side chains attached through the phenyl groups and random or block copolymer derivatives thereof. In preferred embodiments, the polymer block is selected so that the glass transition temperature of the block is less than service temperature and selected such that crystallization does not occur.

The anion is immobilized on the polymer chain of the block copolymer. Typically, the anion is immobilized by formation of the covalent bond with the block copolymer. However, other interactions which provide the requisite immobilization are contemplated within the scope of the invention. Such interactions include, but are not limited to, hydrogen bonding or electrostatic interactions. The immobilized anion may be attached to either the ionically conductive block or the second block by copolymerization with a species including an anionic functionality. By way of example, then the anion is to be localized in the second block, a random or graft copolymer of a non-ionically conductive polymer and an anion-containing species may be used. Similarly, if the anion is to be localized in the ionically conducting block, a random or graft copolymer of an ionically conductive polymer and an anion-containing species may be used.

The anions of the polymer electrolyte may be introduced into the copolymer as a neutral species which is later converted into a charged species. This may be desirable in the cases where the neutral species is less reactive than its anionic derivative. For example, the neutral species may be a carboxylic acid that can be neutralized, for example by addition of lithium or sodium methoxide, to produce the corresponding lithium carboxylate salt, or an ester that can be hydrolyzed to produce the corresponding carboxylate salt. Alternatively, the anion may be introduced into the copolymer as a charged species, such as a sulfonate or a phosphate. The cation in either embodiment may be the mobile cationic species of the electrolytic cell. Alternatively, the cation may be one which is amenable to block copolymer synthesis but which may be replaced by the mobile species in a separate step. For example, $Na^+$ may be replaced by $Li^+$ in an ion exchange reaction.

An additional advantage of the immobilized anionic block copolymer of the invention is its increased electrochemical stability. Conventional electrolyte salts are subject to electrochemical breakdown at voltages (4.5V) that fail to exploit the full capacity of the cathode. A self-doped block copolymer electrolyte is not expected to be subject to electrochemical breakdown at the same voltages as a conventional electrolyte salt with its macroanion character. Thus, the self-doped block copolymer electrolyte allows for the possibility of a high voltage battery and hence a higher energy density. In addition, selection of a counteranion is not limited to those that have high electrochemical breakdown voltages. Virtually any anion capable of incorporation into the block copolymer of the invention is contemplated as within the scope of the invention.

Each of the ionically-conductive and anion-immobilizing blocks can be a mixture of components, that is, each block can be, for example, a random copolymer of different components so long as one block is sufficiently ionically conductive and so long as the material as a whole has sufficient dimensional stability at use temperatures. A block copolymer in which one block (or both blocks) is itself a copolymer such as a random copolymer can result in a non-crystalline block copolymer that, with a more regular sequence of the same components along the chain backbone, would be crystalline.

In one embodiment, it is desirable that the second block comprise a random copolymer of a non-ionically conductive component and a component to tether the anion (anion-immobilizing component). The degree of anionic density, e.g., the salt loading of the electrolyte, is determined by the relative composition of the second block. The higher the immobilized anion portion of the block, the greater the cation loading in the electrolyte (since charge neutrality must be maintained in the electrolyte).

The ratio of the second block to the ionically conductive block is selected to maximize the volume of the ionically conductive domains since the greater the volume fraction of the conductive domains, the higher the conductivity of the electrolyte. This need to provide conductive domains is counterbalanced with the need to provide a second phase in an amount that can microphase separate to form a block copolymer morphology with dimensional stability. The ratio of the volume fraction of the ionically conductive domains to second block domains is desirably in the range of 0.5 to 0.85, and more preferably in the range of 0.65 to 0.85.

In its phase separated state, the polymer electrolyte of the invention contains ionically conductive domains which interact preferentially with the mobile cation, e.g., Li+, Na+, etc. Because there are many sites within the ionically conductive block capable of coordination and/or interaction with the mobile cation, it is possible for the cation to move freely from site to site within the domain. Where the domains form continuous pathways through the electrolyte, it is possible for the mobile cation to move readily between the cathode and the anode, as is required for battery operation. The affinity of the mobile cation for the ionically conductive domains is a function of the number of cation solvating units (typically ethylene oxide or EO) present in the ionically conducting block. The minimum level is not known; however, significant conductivities have been observed with Li:EO ratios in the range of about 1:9 to about 1:27. See, FIGS. 3 through 6 and the Examples herein below.

The continuous ionically-conductive domains define a continuous pathway when the block copolymer is ordered either due to defects in the association of the polymer chains to form the domains or the inherent morphology of the microphase separated block copolymer. Thus, for example, the polymer electrolyte blocks may phase separate locally to form cylindrical or spherical ordered phases in which the ionically-conductive domain forms the continuous matrix phase. Bicontinuous periodic block copolymer morphologies such as a double gyroid arrangement, double diamond configuration or the like can be used. Alternatively, the polymer electrolyte may phase separate into a lamellar (layered) structure. Such a layered structure may or may not form a phase which provides a continuous pathway through the electrolyte between the cathode and the anode (dependent upon the orientation of the lamella). In such cases a continuous phase may nonetheless be formed by introduction of morphological defects to provide a topologically connected continuous ionically-conductive pathway. These structures are known to those of ordinary skill in the art.

Compositions for forming the microphase separated block copolymer electrolyte may be selected so that the ionically-conductive blocks form continuous, ionically-conducting domains upon microphase separation. In one preferred embodiment, both blocks are amorphous, rheologically in a rubbery or melt state, i.e., well above the glass transition temperature $T_g$, and non-crystalline at use temperatures. Components used in the block copolymer form the ordered structure in a manner such that global dimensional stability of the copolymer exists in the absence of crosslinking, crystallization or glassification, while chain mobility that provides ionic conductivity remains high.

The molecular weight of the block copolymer chains of the ionically conductive polymer should be selected to be high enough so that a segregated morphology of use temperatures is formed. Specially, the molecular weight is a least about 50,000 Daltons, preferably at least about 75,000 Daltons, more preferably at least about 100,000 Daltons, more preferably at least 150,000 Daltons, and most preferably at least about 200,000 Daltons.

In preferred embodiments, polymer electrolyte 30 is a block copolymer composition which is not chemically crosslinked, non-crystalline and non-glassy over the typical anticipated use temperature ranges. The temperature range may be from at least about 200° C. to about 700° C. and more preferably in the range of about 0° C. to 80° C. and most preferably in the range of about −25° C. to 100° C. The copolymer blocks further may be selected as described herein below to provide copolymer blocks which are non-glassy and amorphous throughout a temperature range of use, and to provide a continuous ionically conductive pathway through the electrolyte upon microphase separation.

It may also be desirable to introduce a portion of the soluble mobile cation as an electrolyte salt of the prior art. Electrolyte salts suitable for use in the electrolyte of the invention include, but are not limited to, inorganic salts containing a cation selected from the Group Ia and IIa elements associate with anions such as $ClO_4^-$, $SCN^-$, $BF_4^-$, $AsF_6^-$, $CF_3SO_3^-$ (triflate), $Br^-$, $I^-$, $PF_6^-(CF_3SO)_2N_2^-$ (bis (trifluoromethanesulfonyl)imide), $(CF_3SO_3)_3C^-$, (bis (trifluoromethanesulfonyl) carbide), $CF_3CO_2^-$, and the like. The choice of cation is governed by the faradaic process of the electrodes, e.g., $Li^{30}$ for a lithium battery, $Na^+$ for a sodium battery, etc. Lithium ion is a preferred cation.

In other preferred embodiments, it may be desired to add a conductive liquid to the solid polymer electrolyte. The conductive liquid desirably increases the conductivity of the mobile cationic species in the ionically conductive block without substantial deleterious effect to the mechanical integrity or dimensional stability of the block copolymer. Suitable liquid conductors include, but are not limited to, oligomeric PEO or polyethylene glycol dimethyl ether. The lower molecular weight oligomer segregates preferentially into the ionically-conductive domain of the block copolymer, thereby improving the conductivity of the copolymer.

A self-doped block polymer electrolyte may be prepared as follows. Anionic synthesis is well-suited for the preparation of block copolymeric electrolytes with well-defined molecular weights and compositions. For example, the polymerization of methoxypolyethyleneglycol methacrylate (POEM; available from Polysciences) can be initiated anionically to yield to a polymer with a Tg of −60° C. Diblock copolymers of POEM and lauryl methacrylate can be prepared by sequential addition of lauryl methacrylate to living POEM homopolymer. Alternatively, block copolymers can be prepared by reaction of end-functionalized homopolymers, by addition polymerization of one block component onto an end-functionalized homopolymer, or by sequential addition of two monospecies in a living free radical polymerization, or atom transfer radical polymerization.

In instances where a neutral precursor of the anionic species has been used in synthesis, the anionic species may be generated after formation of the block copolymer or after polymerization is complete.

The microphase separated block copolymer can be prepared by solvent casting, solvent evaporation, melt processing, and the like. Upon reduction of temperature, precipitation from solution or evaporation of the solvent, an ordered microstructure having immobilized anions is formed that includes continuous regions of ionically conductive polymer and secondary regions. Such techniques for preparation of microphase separated block copolymers are well known to those of ordinary skill in the art. The interested reader is directed to WO 98/16960 for further information of the preparation and screening of block copolymers with suitable glassy and amorphouse properties and desired dimensional stability. The reference is incorporated herein by reference.

The invention is further illustrated in the following examples which are not intended to be limiting of the invention, the full scope of which is set forth in the claims which follow.

EXAMPLE 1

The following example describes the preparation of a self-doped block copolymer electrolyte in which the anion is carboxylate ($CO_2^-$) and is immobilized in the second phase and the mobile cationic species is lithium. The sample demonstrated acceptable conductivities, particularly at elevated temperatures which established that lithium cations were localized in the ionically conductive domains, even though the anions were microphase separated into the second block domains.

Synthesis. Tetrahydrofuran (THF) was used as solvent for both the anionic polymerization of the block copolymer and the subsequent solvent casting of the self-doped block copolymer films. THF was rigorously purified by refluxing over sodium/benzophenone for 48 hours, and then distilled into sealable Schlenk apparatus immediately before use. Methacrylate monomers were first stirred and vacuum distilled over $CaH_2$, then degassed and distilled again over 25% trioctylaluminum/hexane solution.

The block copolymer was polymerized at –78° C. by the sequential addition of a mixture of purified lauryl methacrylate (LMA, Aldrich) and tert-butyl methacrylate (Polysciences), followed by oligooxyethylene methacrylate (OEM, Aldrich, 9 ethylene oxides per repeat unit), to diphenylmethyl potassium initiator in 350 mL THF. Upon termination of the reaction with degassed methanol, the copolymer solution was concentrated on a rotary evaporator, precipitated in petroleum ether and finally centrifuged to isolate the colorless polymer. The polymer included a 1:1:1 molar ratio of the three monomer components and is referred herein as a 1:1:1 SDBCE.

On the basis of molar content of tert-butyl methacrylate in the block copolymer, a slight stoichiometric excess of p-toluensulfonic acid was added to a 2 vol % block copolymer solution in toluene in order to hydrolyze the methacrylate functional group. The solution was refluxed at 90° C. for 5 hours, during which time the tert-butyl ligand was replaced by a hydroxy group, thereby forming a methacrylic acid (MAA) repeat unit. Following hydrolysis, the block copolymer was precipitated out of solution, whereupon it was separated by filtration and dried in a vacuum oven for 48 hours at 60° C.

The final step in the preparation of the self-doped block copolymer electrolyte involved lithiation of the methacrylic acid groups by neutralization with a suitable base, lithium methoxide. This was accomplished by first drying the hydrolyzed polymer by repeated azeotropic distillation and drying over benzene. Toluene was then transferred into the reactor by cannula to form a 5 wt % solution. Finally, a stoichiometric amount of lithium methoxide was then injected into a small amount (2–3 mL) of polymer solution. Because the presence of methanol induces back-reaction of the lithiated carboxylate, a vacuum line was used to continuously remove methanol as it evolved in the reaction. As the methanol was removed, the block copolymer electrolyte precipitated from solution and was collected by filtration.

Tg determination. To determine the glass transition temperature of the product self-doped block copolymer, differential scanning calorimetry was performed using a Perkin-Elmer DSC7S. In all tests, a scan rate of 10° C./min was used over the temperature range of –60° C. to 180° C. The instrument was calibrated at this scan rate using cyclohexane and $H_2O$ standards. Melting and glass transitions were marked at the onset of deviation from the heating trace. The block copolymer prepared as described as above exhibited a melting temperature ($T_m$) at a temperature of about 85° C., which indicated some crystallinity in the sample at temperatures below 85° C. The crystalline transition was reduced to about room temperature upon addition of about 35 wt % PEGDME to the block copolymer.

Electrical measurements. The electrical conductivity of the block copolymer prepared above was measured by impedance spectroscopy. Specimens were initially dried in a vacuum over at 70° C. for 24 hours. The materials were then transferred to an inert atmosphere, solvated in rigorously anhydrous methanol and solution cast in a polypropylene die. The polymer/salt complex was then annealed in vacuo for 48 hours at 70° C. Under dry nitrogen flow, the self-doped block copolymer was loaded between a pair of blocking electrodes made of type 316 stainless steel, pressed to a thickness of 250 µm and annealed in situ at 700° C. for 24 hours. Over the temperature interval spanning –20° C. to 90° C., conductivity was measured by impedance spectroscopy using a Solartron 1260 Impedance Gain/Phase Analyzer (Solartron Instruments, Allentown, Pa.). Results are shown for the self-doped block copolymer as prepared (FIG. 3) and for the same block copolymer including 35 wt % PEGDME.

Figure 3:
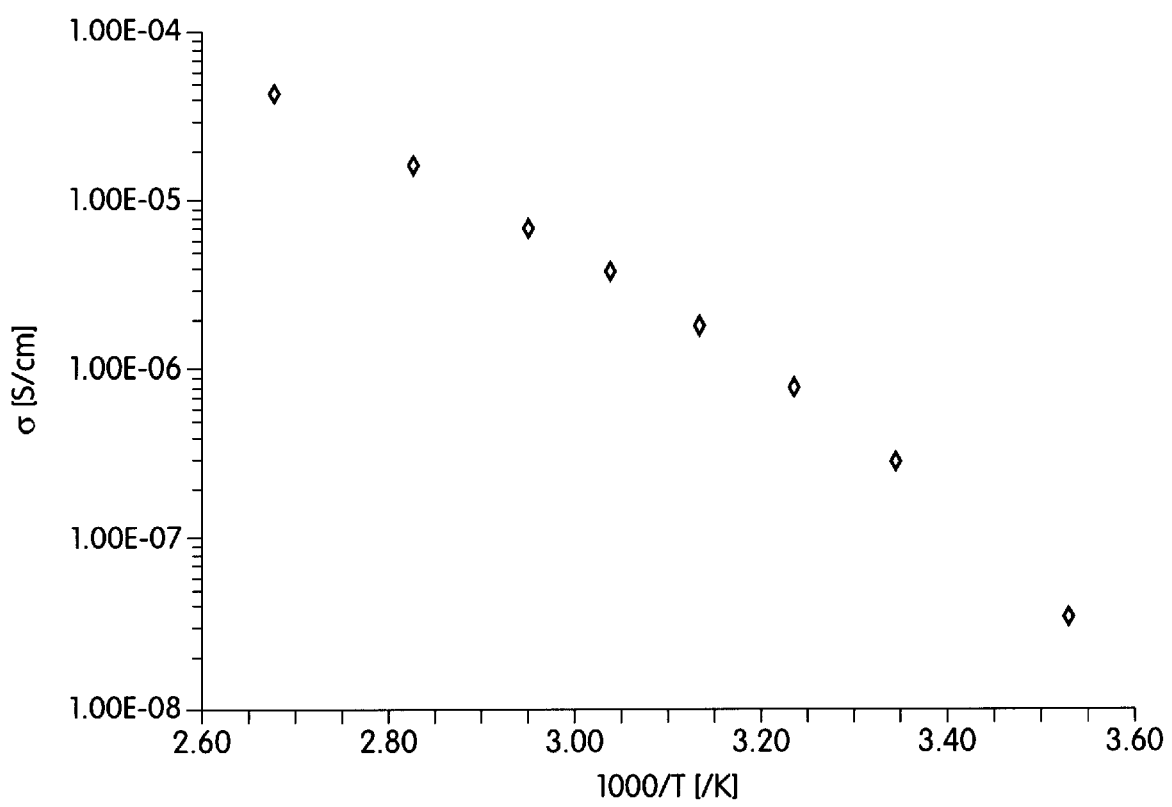
FIG. 3 shows the temperature dependence of the electrical conductivity of a 1:1:1 self-doped block copolymer electrolyte (SDBCE) prepared according to Example 1.

FIG. 3 demonstrates that the self-doped block copolymer of the invention possessed acceptable conductivity, particularly at elevated temperatures. This establishes that lithium cations are localized in the ionically conductive domains, even though the anions are microphase separated into the second block domains.

Figure 4:
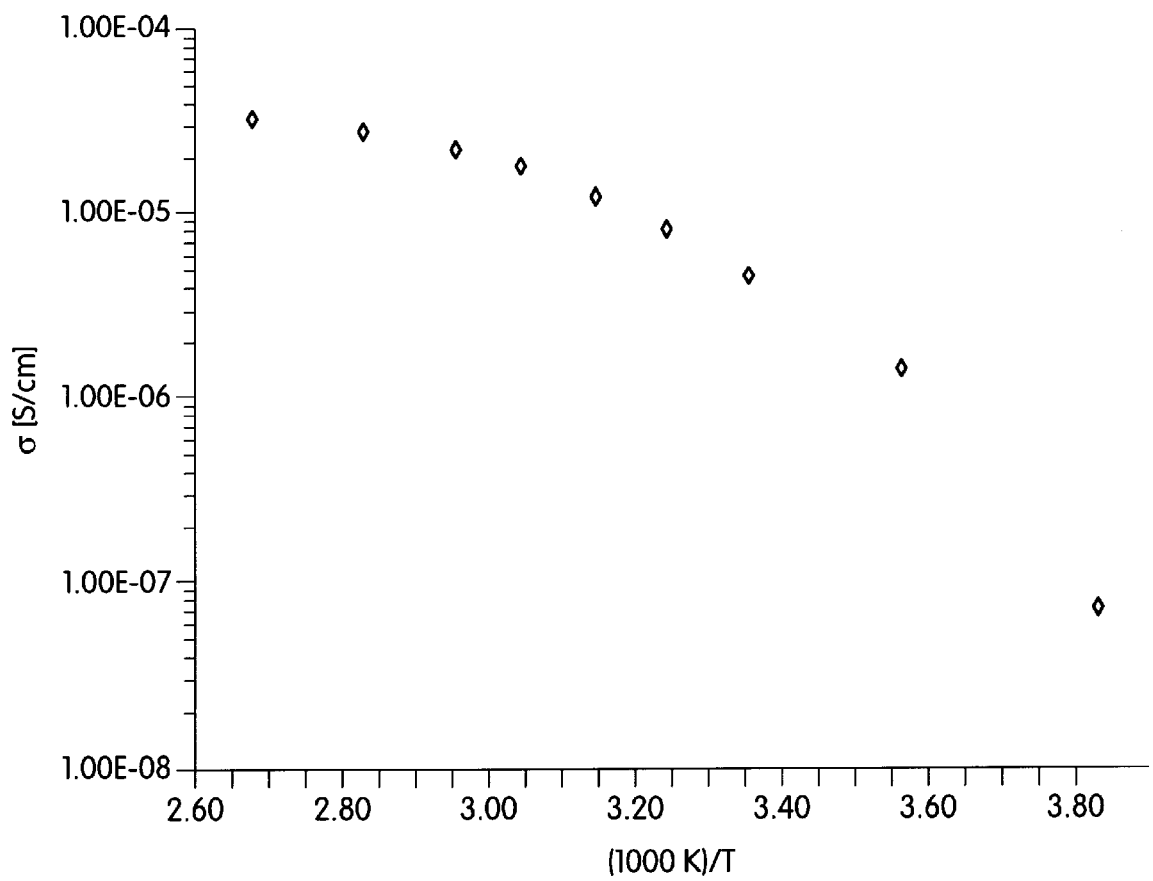
FIG. 4 shows the electrical conductivity of a 1:1:1 self-doped block copolymer electrolyte including addition of polyethyleneglycol dimethylether (PEGDME) prepared according to the example.

FIG. 4 shows the effect of introduction of additional conductive liquids on the conductivity of the electrolyte of the invention. The PEGDME is presumed to localize in the ionically conductive block domains. This has the effect of increasing the conductivity of the polymer without degrading the mechanical properties (the material does not flow). The increased conductivity may be due to the reduced crystallinity of the polymer at room temperature or the increased number of EO units in the ionically conductive domains, or both.

EXAMPLE 2

This example describes the synthesis of an LMA-r-lithium methacrylate (LiMA)-b-POEM block copolymer electrolyte having a 3:1:2 molar ratio of LMA:LiMA:POEM. The different monomer proportions provided a block copolymer having an EO:Li ratio approaching 20, which is the nominal ratio for conventional PEO electrolytes.

Synthesis. The precursor of materials used in this study was first prepared using anionic methods. These methods were similar to those used in Example 1.

Following the isolation of the polymer by reverse precipitation from ethyl acetate and hydrolysis of the methacrylic acid t-butyl functional group, the material was precipitated from solution, filtered and dried. The material then was lithiated in toluene solution by dropwise addition of lithium methoxide (in 1 M methanol solution) under strictly airless and moisture-free conditions. A two-fold molar excess of lithium methoxide was used, and methanol was continuously removed to minimize back reaction. The excess lithium methoxide was removed by precipitation in ethyl acetate, which solvates the block copolymer but not lithium methoxide. To verify that the carboxylic acid group was effectively converted to the lithium carboxylate, FTIR was run on the copolymer before and after lithiation. The 3:1:2 LMA:lithiated methacrylate (LiMA):POEM block copolymer has an EO:Li ratio of 16 when fully lithiated.

A portion of the block copolymer was blended with the conductive liquid, PEGDME, to reduce the glass transition temperature and/or increase conductivity. A 23 wt % PEGDME-blended polymer had an EO:Li ratio of 27:1.

Figure 5:
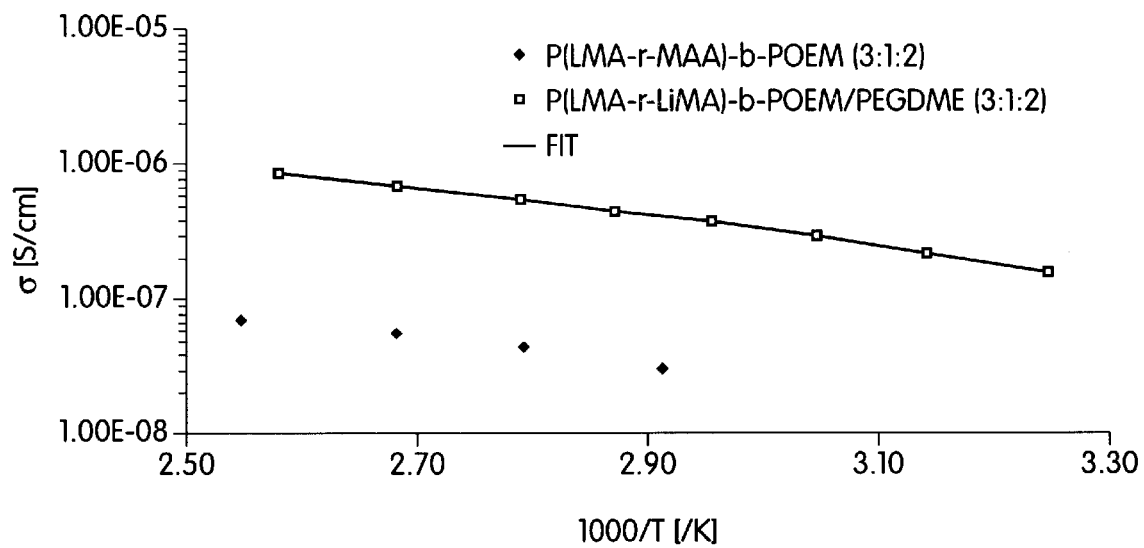
FIG. 5 is a plot of the temperature-dependence of the electrical conductivity for an unlithiated 3:1:2 block copolymer precursor and a lithated 3:1:2 self-doped block copolymer electrolyte, including polyethyleneglycol dimethylether (PEGDME)

Electrochemical testing. Temperature dependent electrical conductivity measurements are shown in FIG. 5. Results for P(LMA-r-LiMA)-b-POEM 3:1:2 with PEGDME added to achieve a EO:Li$^{30}$ ratio of 27:1 revealed conductivities between $10^{-7}$ and $10^{-6}$ S/cm. This represents an improvement in conductivity over the 1:1:1 P(LMA-r-LiMA)-b-POEM/PEGDME sample. The unlithiated copolymer is shown for comparison and was found to conduct over an order of magnitude lower. The results in this latter case are consistent with protonic conductivities reported for other similar polyelectrolytes and suggest that the conductivity of the self doped block copolymer electrolytes of the invention operate by a different mechanism other than proton conduction.

Figure 6:
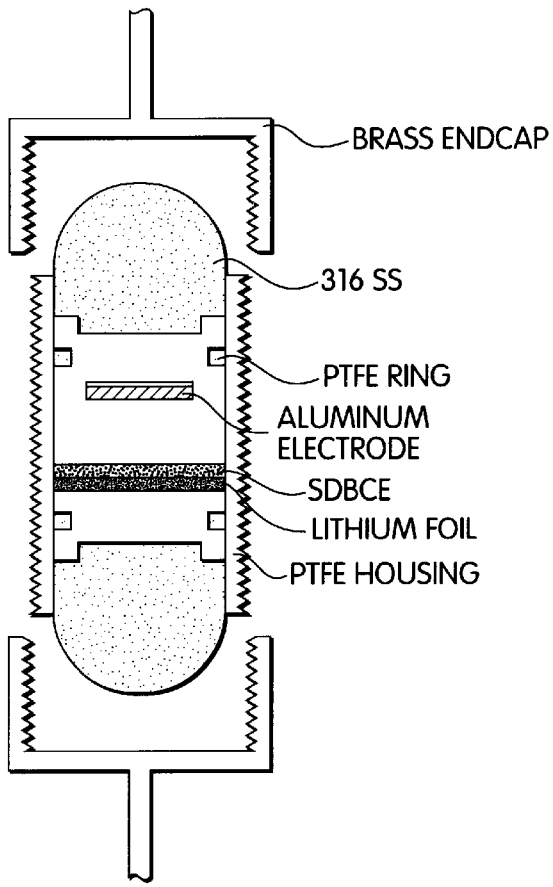
FIG. 6 is a schematic illustration of a cell configuration used in battery charge/discharge testing.

To confirm that the conductivity of the lithiated block copolymer was due to lithium ion conduction, charge-discharge testing was performed on a Li/SDBCE/Al battery coin cell, illustrated in FIG. 6. To prepare this cell, the electrolyte was solution cast onto an aluminum foil electrode from anhydrous ethyl acetate, rigorously dried, and pressed to a thickness of about 150 mm. An aluminum electrode functions by alloying and dealloying with lithium according to the following half-reactions:

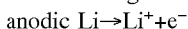
anodic Li→Li$^+$+e$^-$

cathodic xLi++Al+xe$^-$→Li$_x$Al

Figure 7:
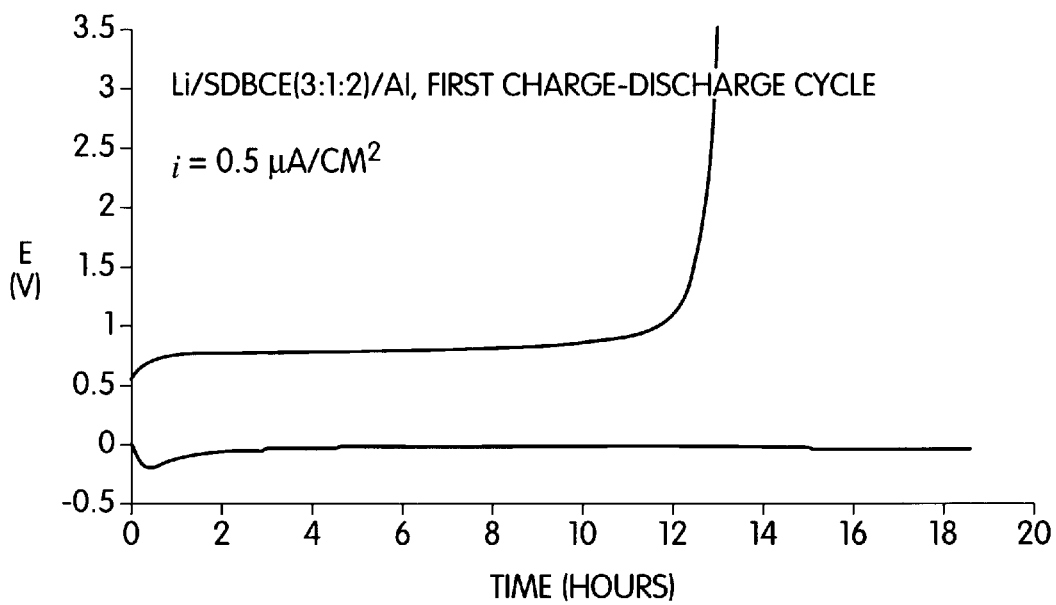
FIG. 7 is a plot of voltage vs. time for a Li/3:1:2 SDBCE/Al coin cell, showing a charge-discharge cycle where $i_{charge} = i_{discharge} = 0.5 \, \mu A/cm^2$.

FIG. 7 shows the first charge-discharge cycle of the test cell at a constant current density of 0.5 μA/cm$^2$. The double plateau at 0.75 and 0 V vs. Li/Li$^{30}$ is consistent with previous studies using this electrode, and confirms that lithium ions are being effectively transported to and from the aluminum. The discharge plateau was wider than the charge plateau, however, indicating some degree of irreversible capacity.

Figure 8:
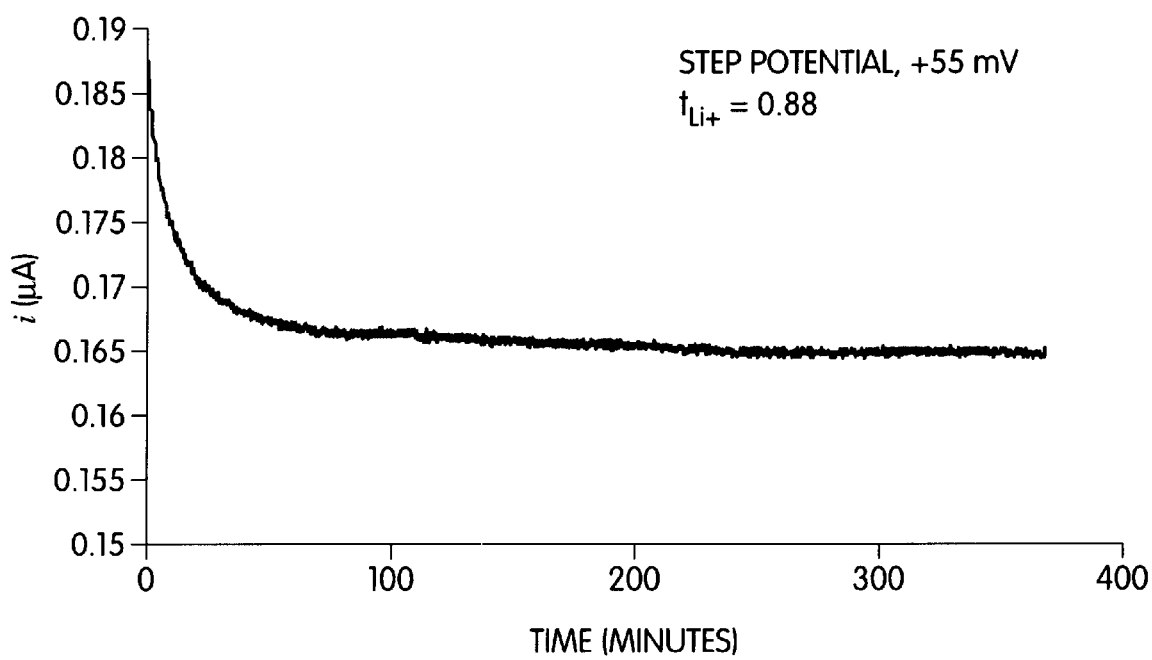
FIG. 8 is a plot of current measured as a function of time, under an applied potential step of 55 mV, used for transference number measurement of the 3:1:2 SDBCE.

To determine whether this material is an effective single ion conductor The lithium transference number of the 3:1:2 block copolymer electrolyte with PEGDME was measured by step potential chronoamperometry. This was accomplished using a symmetric Li/SDBCE/Li cell configuration, which was constructed similarly to the cell in FIG. 6. In this experiment, a 55 mV potential step was applied and current was recorded as a function of time. Because only current due to lithium ion transport is sustainable in this cell at long times, the transference number can be derived from the ratio $i_\infty/i_o$, where $i_\infty$ is the limiting current plateau and $i_o$ is the instantaneous current at t=0. The current profile shown in FIG. 8 was obtained, corresponding to $T_{Li+}$=0.88. Some limited anion mobility was observed, likely the result of small ion impurities in the electrolyte. This might be remedies by better purification of the electrolyte.

Figure 10:
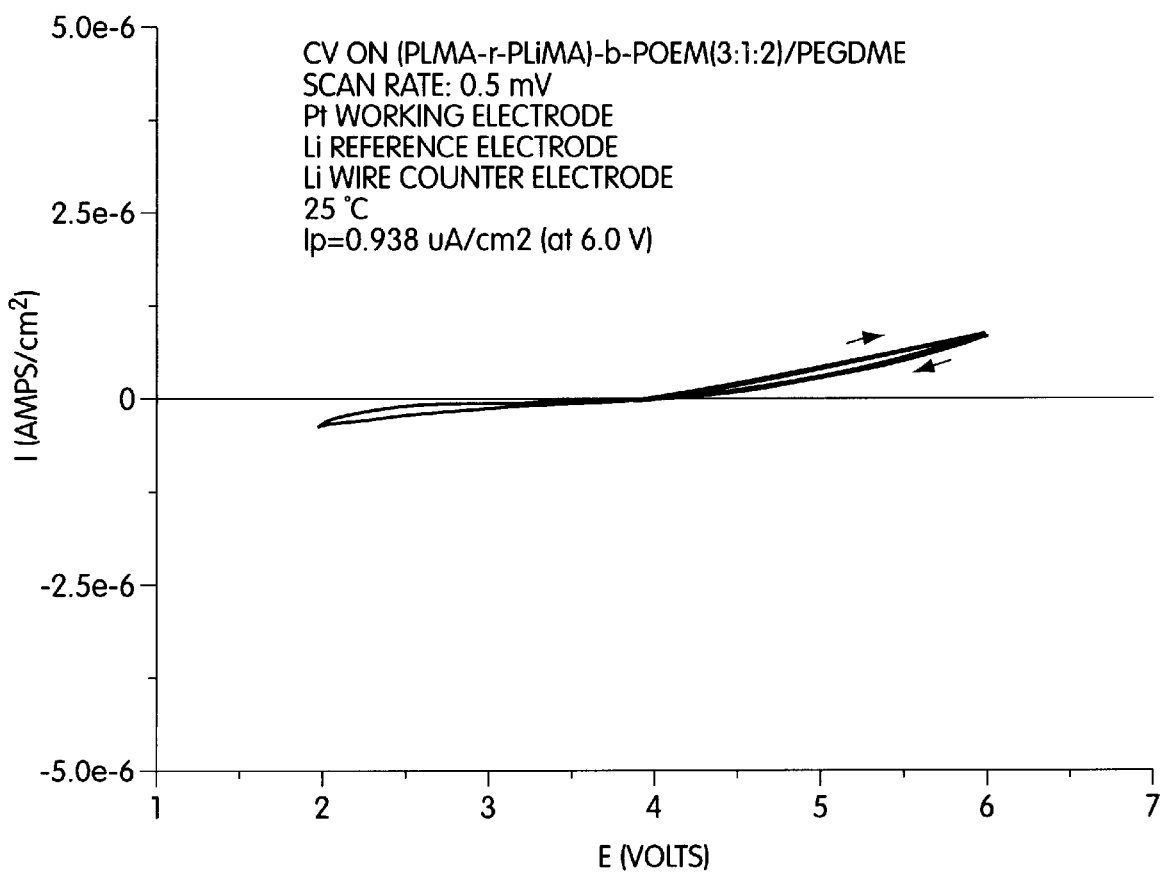
FIG. 10 is a voltammogram of the SDBCE showing the limits of its electrochemical stability.

FIG. 10 shows the results of an experiment to determine the limits of electrochemical stability of the SDBCE. Linear sweep voltammetry was performed at room temperature on the material in a Li/SDBCE/Pt cell with lithium metal also serving as reference electrode. Evidence of the high degree of electrochemical stability of this material is demonstrated by the negligibly small currents measured at extreme potentials, i.e., 0.938×10$^{-6}$ A/cm$^2$ at 6 V.

EXAMPLE 3

A conventional block copolymer electrolyte (BCE) was prepared and its properties were compared with the SDBCE of the invention.

Figure 9:
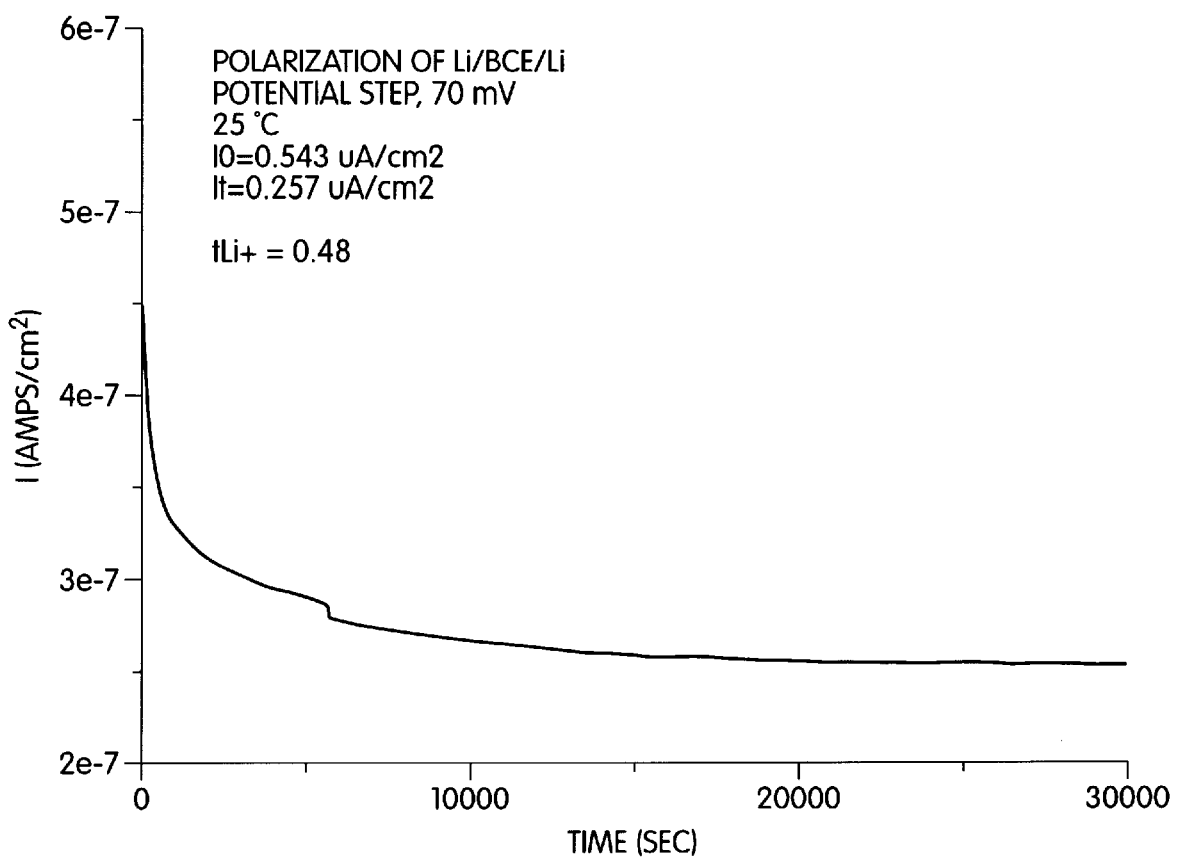
FIG. 9 is a plot of current measured as a function of time under an applied potential step of 70 m V for determination of the lithium ion transference number of a block copolymer electrolyte (BCE)

By way of comparison to the properties of the SDBCE, FIG. 9 shows the transference number measurement of a block copolymer electrolyte (BCE) consisting of PBMA-b-POEM block copolymer into which lithium triflate has been dissolved at a ratio of EO:Li$_{30}$ of 100:1, giving a room temperature conductivity of σ≈2–10$^{-7}$S/cm$^2$. The experiment was performed in a manner similar to that described above in connection with FIG. 8. The transference number of lithium in the salt-doped BCE was measured to be 0.48.

Figure 11:
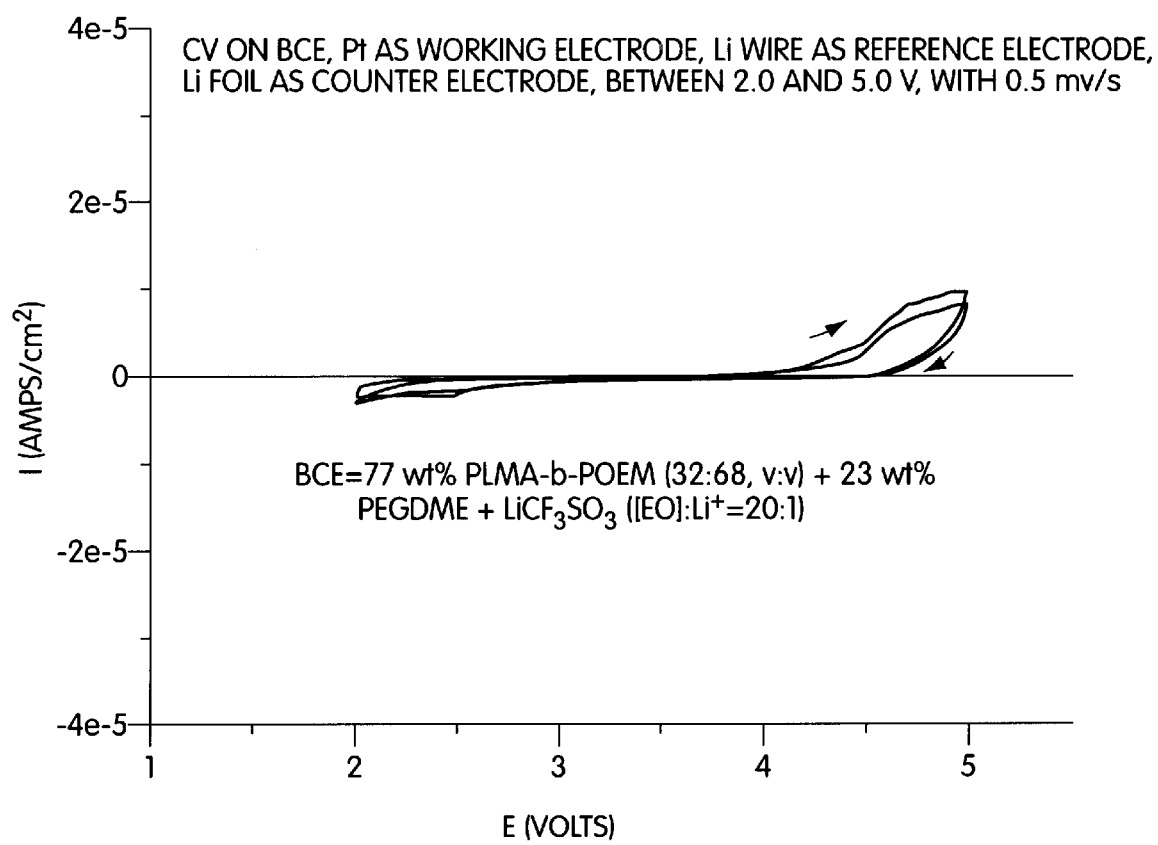
FIG. 11 is a voltammogram of the BCE showing the limits of its electrochemical stability.

FIG. 11 shows the results of an experiment to determine the limits of electrochemical stability of the lithium triflate-doped BCE. Linear sweep voltammetry was performed at room temperature on the material in a Li/BCE/Pt cell with lithium metal also serving as reference electrode. There is evidence of a shallow wave at 4.2V versus lithium which can be attributed to breakdown of the lithium triflate salt. No such wave was observed in FIG. 10 proving the superior electrochemical stability of the self-doped material which is the substance of the instant invention.

What is claimed is:

1. A self-doped block copolymer electrolyte, comprising:
   a microphase separated block copolymer comprising at least one ionically conductive block and at least one second block that is immiscible in the ionically conductive block;
   an anion immobilized on the block copolymer,
   wherein the ionically conductive block provides a continuous ionically conductive pathway through the electrolyte; and
   a mobile cationic species having a transference number greater than 0.5.

2. The polymer electrolyte of claim 1, wherein the mobile cationic species has a transference number greater than about 0.7.

3. The polymer electrolyte of claim 1, wherein the mobile cationic species has a transference number greater than about 0.8.

4. The polymer electrolyte of claim 1, wherein the anion is immobilized in the ionically conductive block.

5. The polymer electrolyte of claim 1, wherein the anion is immobilized in the second block.

6. The polymer electrolyte of claim 1, wherein the ionically conductive block comprises a polymer backbone having polyalkylene glycol side chains.

7. The polymer electrolyte of claim 6, wherein the polymer electrolyte comprises a ratio of alkylene oxide moiety to mobile cationic species in the range of 9:1 to 16:1.

8. The polymer electrolyte of claim 1, wherein the mobile cationic species is selected from lithium, sodium, potassium, magnesium and calcium.

9. The polymer electrolyte of claim 8, wherein the mobile cationic species comprises lithium.

10. The polymer electrolyte of claim 1, wherein the ionically conductive block and the second block are nonglassy and amorphous throughout a temperature range of use.

11. The polymer electrolyte of claim 10, wherein the temperature range is from about 20° C. to about 100° C.

12. The polymer electrolyte of claim 1, wherein the ionically conductive block is selected from the group consisting of methoxypolyethylene glycol methacrylate, methoxypolyethylene glycol acrylate, acrylate polymers modified to include polyethylene oxide and polyethylene glycol side chains, methacrylate polymers modified to include polyethylene oxide and polyethylene side chains, polybutadiene or polyisoprene modified so as to include polyethylene oxide or polyethylene glycol side chains, polystyrene similarly modified through the phenyl group to include polyethylene oxide or polyethylene glycol side groups and random or block copolymer derivatives thereof.

13. The polymer electrolyte of claim 12, wherein the polyalkylene oxide or polyalkylene glycol side chains are of a length less than about 20 oxide units.

14. The polymer electrolyte of claim 1, wherein the volume fraction of the ionically conductive block is in the range of about 0.50 to about 0.85.

15. The polymer electrolyte of claim 1, wherein the second block comprises a copolymer of a first monomer selected for its ability to microphase separate from the ionically conductive block and a second monomer comprising an anion or neutral precursor of an anion.

16. The polymer electrolyte of claim 1, wherein the ionically conductive block comprises a copolymer of a first ionically conductive monomer and a second monomer comprising an anion or neutral precursor of an anion.

17. The polymer electrolyte of claim 15 or 16, wherein the copolymer is a random copolymer.

18. The polymer electrolyte of claim 1, wherein the amount of immobilized anion is selected to provide a specified anionic concentration in the electrolyte.

19. The polymer electrolyte of claim 1, wherein the second block is selected from the group consisting of polydecyl methacrylate, polylauryl methacrylate, polyalkylacrylates and methacrylates, polydimethyl siloxane, polybutadiene, polyisoprene, poly ethylethylene and polyethylene propylene and copolymers thereof, and modified polystyrenes with flexible side chains of alkyl fluorocarbon and siloxane side chains attached through the phenyl groups and random or block copolymer derivatives thereof.

20. The polymer electrolyte of claim 15 or 16, wherein the second anion-containing polymer comprises a hydrocarbon backbone having anionic side chains or neutral precursor thereof.

21. The polymer electrolyte of claim 20, wherein the anion is selected from carboxylates, carboxylic acids and ester derivatives thereof, sulfonates, imides, phosphates and iodinates.

22. The polymer electrolyte of claim 1, wherein the anion is selected from the group consisting of carboxylates, carboxylic acids and ester derivatives thereof, sulfonates, imides, phosphates and iodinates.

23. The polymer electrolyte of claim 1, wherein the ionically conductive block comprises a polymer having a molecular weight of at least 50,000 Daltons.

24. The polymer electrolyte of claim 1, wherein the ionically conductive block comprises a polymer having a molecular weight of at least 75,000 Daltons.

25. The polymer electrolyte of claim 1, wherein the ionically conductive block comprises a polymer having a molecular weight of at least 100,000 Daltons.

26. The polymer electrolyte of claim 1, wherein the ionically conductive block comprises a polymer having a molecular weight of at least 200,000 Daltons.

27. The polymer electrolyte of claim 1, further comprising a conductive liquid.

28. The polymer electrolyte of claim 27, wherein the polymer electrolyte comprises a ratio of alkylene oxide moiety to mobile cationic species in the range of 15:1 to 30:1.

29. The polymer electrolyte of claim 27, wherein the conductive liquid is selected from the group consisting of oligomeric polyethylene oxide and polyethylene glycol dimethyl ether.

30. A battery comprising:
  (i) an electrolyte comprising:
    a microphase separated block copolymer comprising at least one ionically conductive block and at least one second block that is immiscible in the ionically conductive block;
    an anion immobilized on the block copolymer;
    wherein the ionically conductive block provides continuous ionically conductive pathways through the electrolyte; and
    a mobile cationic species having a transference number greater than 0.5;
  (ii) a negative electrode in electrical contact with the electrolyte;
  (iii) a positive electrode in electrical contact with the electrolyte and separated from the negative electrode; and
  (iv) an external circuit in electronic communication with the negative and positive electrodes.

* * * * *

UNITED STATES PATENT AND TRADEMARK OFFICE
CERTIFICATE OF CORRECTION

PATENT NO.   : 6,361,901 B1
DATED        : March 26, 2002
INVENTOR(S)  : Anne M. Mayes et al.

It is certified that error appears in the above-identified patent and that said Letters Patent is hereby corrected as shown below:

Title page, Item [54] and Column 1, line 1,
Title, replace "MICOPHASE" with -- MICROPHASED --;

Column 6,
Lines 15, 18 and 20, replace "$T_{Li}$" with -- $t_{Li}$ --;
Lines 17 and 21, replace "$Li^{30}$" with -- $Li^+$ --;
Line 35, replace "varies" with -- variety --;
Line 43, replace "copolumer" with -- copolymer --;
Line 55, replace "lock" with -- block --;
Line 67, replace "from a accumulating" with -- from accumulating --;

Column 7,
Line 4, replace "$T_{Li}$" with -- $t_{Li}$ --;
Line 8, replace "umber" with -- number --;
Lines 10 and 24, replace "lock" with -- block --;
Line 13, replace "t at" with -- that --;
Line 20, replace "made p" with -- made up --;
Line 42, replace "unit" with -- units --;

Column 8,
Line 14, replace "then" with -- when --;
Line 27, replace "methoxide ," with -- methoxide, --;

Column 10,
Line 11, replace "200º C. to about 700º C." with -- 20º C. to about 70º C --;
Line 29, replace "$Li^{30}$" with -- $Li^t$ --;

Column 12,
Line 29, replace "700º C." with -- 70º C. --;

Column 13,
Line 21, replace "$EO:Li^{30}$" with -- $EO:Li^+$ --;
Line 43, replace "xLi++Al+xe" with -- $xLi^+$+Al+xe --;
Line 53, replace "conductor The Lithium" with -- conductor the lithium --,
Line 64, replace "$T_{Li+}$" with -- $t_{Li+}$ --; and

UNITED STATES PATENT AND TRADEMARK OFFICE
CERTIFICATE OF CORRECTION

PATENT NO. : 6,361,901 B1
DATED : March 26, 2002
INVENTOR(S) : Anne M. Mayes et al.

It is certified that error appears in the above-identified patent and that said Letters Patent is hereby corrected as shown below:

<u>Column 14,</u>
Line 17, replace "$Li_{30}$" with -- $Li^+$ --.

Signed and Sealed this

Eleventh Day of February, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,361,901 B1
DATED : March 26, 2002
INVENTOR(S) : Anne M. Mayes et al.

It is certified that error appears in the above-identified patent and that said Letters Patent is hereby corrected as shown below:

Title page, Item [54] and Column 1, line 1,
Title, replace "MICOPHASED" with -- MICROPHASE --;

Column 6,
Lines 15, 18 and 20, replace "$T_{Li}$" with -- $t_{Li}$ --;
Lines 17 and 21, replace "$Li^{30}$" with -- $Li^+$ --;
Line 35, replace "varies" with -- variety --;
Line 43, replace "copolumer" with -- copolymer --;
Line 55, replace "lock" with -- block --;
Line 67, replace "from a accumulating" with -- from accumulating --;

Column 7,
Line 4, replace "$T_{Li}$" with -- $t_{Li}$ --;
Line 8, replace "umber" with -- number --;
Lines 10 and 24, replace "lock" with -- block --;
Line 13, replace "t at" with -- that --;
Line 20, replace "made p" with -- made up --;
Line 42, replace "unit" with -- units --;

Column 8,
Line 14, replace "then" with -- when --;
Line 27, replace "methoxide ," with -- methoxide, --;

Column 10,
Line 11, replace "200º C. to about 700º C." with -- 20º C. to about 70º C --;
Line 29, replace "$Li^{30}$" with -- $Li^t$ --;

Column 12,
Line 29, replace "700º C." with -- 70º C. --;

Column 13,
Line 21, replace "$EO:Li^{30}$" with -- $EO:Li^+$ --;
Line 43, replace "xLi++A1+xe" with -- $xLi^+ + Al + xe$ --;
Line 53, replace "conductor The Lithium" with -- conductor the lithium --,
Line 64, replace "$T_{Li+}$" with -- $t_{Li+}$ --; and

UNITED STATES PATENT AND TRADEMARK OFFICE
CERTIFICATE OF CORRECTION

PATENT NO. : 6,361,901 B1
DATED : March 26, 2002
INVENTOR(S) : Anne M. Mayes et al.

It is certified that error appears in the above-identified patent and that said Letters Patent is hereby corrected as shown below:

<u>Column 14,</u>
Line 17, replace "$Li_{30}$" with -- $Li^+$ --.

This certificate supersedes Certificate of Correction issued February 11, 2003.

Signed and Sealed this

Eighth Day of April, 2003

JAMES E. ROGAN
*Director of the United States Patent and Trademark Office*